(12) United States Patent
Rendina

(10) Patent No.: US 7,435,491 B2
(45) Date of Patent: Oct. 14, 2008

(54) RENEWABLE, ENERGETIC, NANODIMENSIONAL DISPERSION

(76) Inventor: David Deck Rendina, 967 Heritage Blvd, North Vancouver, BC (CA) V7J 3G6

( * ) Notice: Subject to any disclaimer, the term of this patent is extended or adjusted under 35 U.S.C. 154(b) by 163 days.

(21) Appl. No.: 10/409,911

(22) Filed: Apr. 8, 2003

(65) Prior Publication Data

US 2003/0190501 A1   Oct. 9, 2003

Related U.S. Application Data

(60) Provisional application No. 60/370,665, filed on Apr. 8, 2002.

(51) Int. Cl.
*H01M 8/04* (2006.01)
*H01M 8/00* (2006.01)

(52) U.S. Cl. ............................... 429/17; 429/12

(58) Field of Classification Search ............... 429/17, 429/12
See application file for complete search history.

(56) References Cited

U.S. PATENT DOCUMENTS

| 3,791,871 | A |   | 2/1974  | Rowley |   |
|---|---|---|---|---|---|
| 4,229,196 | A |   | 10/1980 | Woollam |   |
| 4,481,266 | A |   | 11/1984 | Littauer et al. |   |
| 4,608,192 | A | * | 8/1986  | Su | 252/506 |
| 4,692,390 | A | * | 9/1987  | Roy | 429/17 |
| 5,525,442 | A |   | 6/1996  | Shuster |   |
| 5,569,558 | A | * | 10/1996 | Takeuchi et al. | 429/122 |

* cited by examiner

*Primary Examiner*—Patrick Ryan
*Assistant Examiner*—Julian Mercado
(74) *Attorney, Agent, or Firm*—Anthony C. Edwards

(57) ABSTRACT

Fuel cells, and renewable-semi-liquid fuel mixtures, useful as anode materials, for said fuel cells are disclosed. The fuels are comprised in part of materials intercalated with hydrogen, alkali metals, or alkali metal hydrides, dispersed in liquid carriers. The chemical energy generated by the reaction of the fuel mixtures with oxygen, or an oxygen carrier such as air, water, or hydrogen peroxide, can be converted into electrical energy in fuel cells. Once converted, the by-products of the reaction may be collected and those components that where chemically modified in the reaction can be renewed by conversion or re-intercalation of hydrogen, alkali metals, or alkali metal hydrides.

29 Claims, No Drawings

RENEWABLE, ENERGETIC, NANODIMENSIONAL DISPERSION

RELATED REFERENCES

Reference is hereby made to commonly assigned provisional U.S. Patent application RENEWABLE, ENERGETIC, NANODIMENSIONAL, DISPERSION, Ser. No. 60/370,665, filed Apr. 8, 2002, the benefit of which is hereby claimed and the disclosure of which is incorporated herein by reference.

FIELD OF THE INVENTION

The subject invention relates to fuel cells and unique compositions of matter useful as energy carriers for conversion to electrical energy in fuel cells. Said compositions may be applied directly as semi-liquid fuels to replace gaseous hydrogen or hydrocarbon fuels in simple, inexpensive fuel cells.

BACKGROUND OF THE INVENTION

The supply of hydrocarbon fuels is limited. When hydrocarbons are used as energy carriers and converted into mechanical or electrical energy they generate polluting by-products. The need to replace hydrocarbon based energy carriers with non-polluting renewable energy carriers is recognized worldwide.

Pure hydrogen has been identified as a potential renewable energy carrier. When electrical energy produced in one location from renewable sources, such as sunlight, wind, or hydroelectric power, is converted into hydrogen, and the hydrogen is subsequently converted at another location back into electrical energy in a fuel cell, hydrogen acts as an energy carrier and no pollution is inherently produced. However, the transportation and storage of hydrogen is difficult and volumetrically inefficient due to the small size of the hydrogen molecule and its volatility in air. Further when gaseous hydrogen is used, rare and expensive catalysts must be incorporated into the fuel cell in order to convert molecular hydrogen into ionic materials that can be transported across the fuel cell membrane. The inefficiency in this system is not a result of the energy conversion devices it is an inherent fault in the nature of the energy carrier. In other words the problem with this system of renewable energy is not the fuel cell it is the fuel.

It has long been known that other ionic materials such as alkali metal ions may be transported across membranes to combine with oxygen and produce electrical energy in a process analogous to hydrogen/oxygen fuel cells. Shuster, In U.S. Pat. No. 5,525,442 entitled "Alkali Metal Battery", describes a battery with a solid alkali metal anode deposed in a non-aqueous medium and separated by a membrane from the oxygen cathode contained in water.

For the purposes of this disclosure the term battery refers to an energy conversion device where the quantity of at least one of the reactants is predetermined by the size of the conversion device and the total quantity of said reactant available for conversion is contained within the structure of the battery. In the case of the Shuster battery described above, the cell uses a solid lithium anode. The scale (size, energy capacity) of the battery is directly proportional to the scale (size, energy capacity) of the anode.

For the purposes of this disclosure, the term fuel cell refers to an energy conversion device where the quantities of both chemical reactants are supplied from a source external to the conversion device. Thus the scale of the conversion device may be independent of the quantity of the reactants. The quantity of both positive and negative chemical reactants can be adjusted or replenished without modifying the conversion device.

Alkali metals are attractive candidates for metal/air and metal/water batteries because of their inherently high energy densities. They have generally not been commercially acceptable, due at least in part, to difficulties in controlling parasitic corrosion reactions and the tendency of the materials to thermally "run away". Fuel cell and battery art has long taught the limiting necessity of separators, spacers, membranes, porous barriers, dynamic films, mercury amalgams, alloys with less active metals, non-aqueous electrolytes, or high temperature molten salts between the cell electrodes to prevent mechanical shorting and prevent direct, violent chemical combinations where alkali metals were utilized. In recent years new materials called intercalation compounds or insertion compounds have been developed for alkali metal batteries, and in particular for lithium batteries, to mitigate these runaway conditions.

When hydrogen is used as the insertion material the resulting compounds are often referred to as reversible hydrides and the bond between the intercalated host material and the inserted hydrogen is called an occluded bond. For the purposes of this invention we restrict our definition of intercalation compounds to only those materials that can be intercalated with hydrogen, alkali metals, alkali metal hydrides, or combinations of hydrogen and alkali metals.

Intercalated materials may be conceptualized as compounds being comprised of two components, a "host" material, and a visiting insertion material or "intercalate". The host material may be defined as elements, naturally occurring intermetallic compounds, or synthetic compounds and structures that allow the reversible insertion of ions, atoms, or molecules of another material—the insertion material or intercalate—within spaces in the host structure. The bonding of the host material with the intercalate does not adversely change the chemical-to-electrical energy conversion properties of the intercalate significantly. For the purposes of this disclosure, reversible intercalation may be defined as a property of a host intercalation material to repeatedly accept the insertion and removal of an intercalate. Methods for the insertion of the intercalate are numerous and well known, including electrical, chemical, and mechanical methods. Said intercalation methods do not form a part of the present invention and any appropriate method for producing an intercalated material may be employed.

It is well known in the art that metal hydrides and certain nanostructured materials such as graphitic carbon, carbon nanotubes, house-of-card (HOC) structure $MoS_2$, alkali metal/carbon structures, layered silicon structures, and many others can be made to reversible intercalate or occlude hydrogen. These materials can also be fractured by known methods into particles with dimensions suitable for classification, when dispersed in liquids, as sols. Although these dispersed materials may be used directly in fuel cells, and their use without alkali metals would not depart from the scope of this invention disclosure, on the basis of energy density these materials are typically less efficient than lithium intercalation compounds. It would be beneficial with respect to energy density if the intercalation host and/or the alkali metal that is intercalated, as described above, could also be intercalated with hydrogen.

Further, hydrogen may be intercalated in two forms. Most often, in metal hydrides that are unsuitable for battery alloys, like magnesium hydride, calcium hydride, and AB alloy hydrides, etc., the hydrogen is retained as molecular hydrogen ($H_2$). However, hydrogen intercalated in nickel metal hydride batteries or in other nanostructured materials such as exfoliated transition metal dichalcogenides as described in U.S. Pat. No. 4,229,196 to Woollam, entitled "Atomic Hydrogen Storage Method and Apparatus", is retained as atomic hydrogen. In hydrogen/oxygen fuel cells, noble metal catalyst are required to "break" molecular hydrogen into atomic hydrogen prior to use in the cell. This requirement adds significant cost and complexity to the fuel cell. It would be beneficial if the intercalation host and/or the intercalated alkali metal could be induced to bind atomic hydrogen, as for example in LiH, and thereby mitigate, reduce, or eliminate the need for noble metal catalyst in fuel cells.

Alkali metal intercalation compounds have recently been commercialized for use in lithium ion batteries. These compounds help to limit the quantity of free lithium metal in the cell. They are often employed as cathodes that can accept a lithium ion on discharge and hold it safely until it is re-plated on the lithium anode during recharge. However, these materials may also act as anodes in some configurations such as the "rocking chair" battery where lithium ions are transferred back and forth between two carbon electrodes. It has only been possible to commercialize lithium batteries for consumer products because these new intercalation materials can reduce the free lithium in the cells and mitigate the parasitic corrosion reaction with its attendant release of heat. Lithium ions can store significantly more energy on a volumetric basis than hydrogen in a practical manner. Lithium ions can also be induced to travel through membranes to react with oxygen and in the process generate an electric current.

Finally, many alkali metal intercalation compounds can be formed or fractured into small particles by known methods. Once fractured, they can remain suspended in liquid electrolytes for extended periods of time. In fact, many of these alkali metal intercalation compounds may be easily broken or formed into particles that when dispersed in liquids fit within the dimensional definition of a sol. Many of them will remain dispersed in liquid electrolytes for months. Some of them can be formed into particles that will remain suspended for years. It would be beneficial for volumetric energy efficiency and many other benefits if these materials could be directly circulated as anodes in fuel cells.

As described above, alkali metal/air batteries are well known in the art. Controlling the parasitic corrosion reaction is a critical barrier for their commercial acceptance. Many methods have been described in the literature for achieving this control. For example, Rowley in U.S. Pat. No. 3,791,871 entitled "Electrochemical Cell" describes a method that utilizes the reactant by-product, in this case lithium hydroxide, to limit the reaction.

Many have found ways to control the corrosion reaction other than modifying the chemical composition of the anodes, cathodes, separators, and electrolytes. For example, Littauer et al. in U.S. Pat. No. 4,481,266, describes a method for controlling the quantity of electrolyte so that only a portion of the cathode is exposed in the reaction at any given time. However, all of the methods disclosed to date, that rely on alkali metals for anodes, have overlooked the self-limiting benefits and flow characteristics afforded by intercalation compounds. Further, none of them have described the additional benefits in energy density and cost that can be achieved with particles comprised of intercalated alkali metals, alkali metal hydrides, or occluded hydrogen. It would be beneficial if a high energy density material with flow characteristics and viscosity that allowed the duration of the reaction and quantity of reactants to be controlled by the flow of the anode material could be employed. It would also be beneficial if the transport of the reactant allowed the use of existing liquid handling systems currently employed to handle liquid hydrocarbons.

In addition to flow characteristics and viscosity, controlling the particle size of the intercalation host may enhance other benefits. For example the additional benefits in rate of heat transfer and particle suspension time that may be enjoyed by employing nanodimensional particles of materials are well known. Enhancing the heat transfer of the liquid fuel of the present invention would provide an additional means to mitigate the deleterious effects of parasitic corrosion. Therefore, it would be beneficial if the intercalation compound could be comprised in part of particles where at least one dimension of the intercalation host was in the sub-micron or nanodimensional range.

SUBJECT OF THE INVENTION

It is an object of the present application to disclose a renewable fuel designed for carrying chemical energy in a form suitable for transport and distribution by currently available, or minimally modified, liquid hydrocarbon infrastructures such as tanker trucks, ships, and pipelines.

It is a further object of the present application to disclose a high energy density, renewable fuel that may be directly converted into electrical energy in a fuel cell without the inherent generation of gaseous pollutants.

It is a further object of the present application to disclose a fuel comprised of materials that produce recoverable by-products that may be renewed by the intercalation of hydrogen, alkali metals and/or alkali metal hydrides. Other objects of the invention will become apparent from the description that follows.

The inventor has discovered that fine particles of intercalated compounds may be dispersed in liquid carriers and circulated as reactant carrying mixtures in fuel cells. Said mixtures may be utilized to carry hydrogen, alkali metals, and alkali metal ions to the fuel cell membrane relatively safely. By their nature, intercalation compounds serve as a means for limiting the parasitic corrosion reactions that often occur when alkali metals are exposed to oxygen. The parasitic reaction may also be controlled by controlling the flow of anode materials at rates sufficient to allow only a portion of the chemical reactants carried to be involved in the reaction at any given time. The deleterious effects of parasitic corrosion caused by the accumulation of heat may be further mitigated by the size of the particle of intercalation materials dispersed in said mixtures

DETAILED DESCRIPTION OF THE INVENTION

Accordingly, the present invention provides a mixture designed to meet the stated objectives which is comprised of at least components (a), (b), (c), of the following components (a), (b), (c), (d), (e), and (f):

(a) Particles comprising intercalation hosts—selected from elements compounds and alloys, suitable for intercalation of hydrogen, alkali metals, and alkali metal hydrides selected from C, Si, Sn, Mg, Ca, $MoS_2$, $WS_2$, $TaS_2$, $TiS_2$, $Ti_{1.1}S_2$, $ZrS_2$, $HfS_2$, $NbS_2$, $TiSe_2$, $VSe_2$, $NbSe_2$, $HfSe_2$, $TaSe_2$, $TiTe_2$, $HfTe_2$, $VTe_2$, $MoTe_2$, $WSe_2$, $MoSe_2$, $ReSe_2$, $PtSe_2$, $V_3S_8$, $TiS_3$, $ZrS_3$, $ZrSe_3$, $HfS_3$, $HfSe_3$, $NbS_3$, $NbSe_3$, $Bi_2Te_3$, $VS_4$, LiAl, and other modified or standard $AB$, $AB_2$, $AB_5$, alloys and chemical hydrides. Other materials such as organic polymers and the like may be utilized without departing from the scope of the invention provided that they maybe reversibly intercalated according to the definition of reversible intercalation provided in this disclosure, with hydrogen, alkali metals, or alkali metal hydrides. Compounds, mixtures, and alloys of more than one of the intercalation hosts may also be employed.

It is generally preferred that said intercalation hosts be selected on the basis of their ability to store the highest quantity of intercalate in a reversible manner, and to release the intercalate in a rapid but controlled manner under pressure and temperature conditions typically available in the fuel cell. Other factors that would typically control the selection of the intercalation host would be the weight of the host in relation to the quantity of intercalate, and the size of the particles of the intercalation host with lighter, smaller particles being generally more preferred. Particles in the size range between 0.5 nanometers and 10 microns are preferred. Particles with at least one dimension in the nanodimensional range and no dimension greater than 2 microns are most preferred. Other factors may also be considered, such as cost and availability. Carbon, silicon, molybdenum disulfide and organic polymer layered dichalcogenides that meet the above criteria are preferred. Carbon and molybdenum disulfide particles are the most preferred intercalation host materials.

(b) Intercalates—including hydrogen, alkali metals, and alkali metal hydrides. Lithium and hydrogen are preferred intercalates, and lithium hydride is most preferred.

(c) Liquid carriers—these materials are selected on the basis of their ability to transport intercalated particles through a fuel cell, and their resistance to deleterious reactions with the intercalated particles. It is preferred that the quantity of component (c) in the mixture be sufficient to provide an overall mixture viscosity of between 0.28 centi-Poise (cP) and 10,000 cP. It is more preferred that the viscosity range between 1.2 cP and 102 cP, and most preferred that the viscosity range between 19.9 cP-84 cP. In addition to transport qualities, the carriers may be selected on the basis of their ability to enhance or inhibit the speed of the desired reaction of the selected intercalate.

Typically they would be organic solvents with high dielectric constants to promote the dissociation of the low lattice energy lithium salts, thereby forming a highly conductive electrolyte medium. This requirement is often met by organic solvents used in lithium batteries having electron donor atoms such as O and N through which the solvents can form complexes (or solvates) with the Li ions. In addition to ethylene carbonate and propylene carbonate, organic solvents preferred as carrier liquids are dimethyl sulfoxide (DMSO), tetramethylene sulfone (sulfolane), γ-butyrolactone, N-methyl-2-pyrrolidinone (NMP) and tri- and tetraglymes. These solvents have high boiling points are non-corrosive to lithium and may augment the stability of the fuel under anticipated operating conditions. However, other liquids such as hexane, methanol, mineral oils, and other liquid hydrocarbons and alcohols and mixtures and combinations of these carriers may be employed, provided that they are compatible, i.e. do not react chemically, with the intercalated particles and that they provide a means to transport the intercalated particles through the fuel cell.

(d) Conductive additives—should not comprise more than 20% by weight of the mixture and are used to enhance the movement of ions through the said carrier liquid (c). Without intending to limit the scope of conductive additives that can be employed, said additives might be comprised of alkali metal salts or alkali earth metal salts. The requirement for selection of an alkali salt in the compound is that it is sufficiently soluble in the liquid carrier to form a conductive solution. When the preferred lithium based intercalation compounds are used, lithium salts are preferred additives.

Salts used as additives to liquid carriers in the composition are preferably selected on the basis of the same principles used for selecting these components for highly conductive liquid electrolytes. When lithium intercalates are used, these requirements include: 1) lithium salts having large anions and low lattice energies such as $LiClO_4$, $LiAsF_6$, $LiBF_4$, $F_1CF_3SO_3$, $LiPF_6$ and $LiN(CF_3SO_2)_2$ other salts that may be useful such as LiOH and LiCl may be employed as long as they do not detrimentally react with the intercalation compound and are soluble in the selected organic solvent. The preferred benefits may typically be realized with Li salts such as $LiClO_4$, $LiPf_6$, $LiN(SO_2CF_3)_2$ and $LiAsF_6$ and organic solvents such as propylene carbonate and ethylene carbonate with dielectric constants of 64.4 and 89.6 respectively.

(e) Safety modifiers—should not comprise more than 20% by weight of the mixture and may be added to enhance the safe transportation characteristics of the fuel composition. These may be selected on the basis of their compatibility with the other components of the fuel composition and may be used to suppress odors, or to create distinctive odors, or inhibit reactions with the materials found in the environment like air or water. Preferred safety modifiers include oils such as vegetable and mineral oils, and surfactants.

(f) Handling modifiers—should not comprise more than 20% by weight of the mixture and may be added to improve the stability of the mixture for extended periods of time. Preferred handling modifiers include gelling agents, swelling agents, diluents, and surfactants. Most preferred are inverse surfactants, aprotic solvents such as tetrahydrofuron, dimethylformamide, hexane, methanol, and the like, as well as sugars, and inorganic fillers such as dispersed metal oxides and clays.

EXAMPLE 1

A composition according to the present invention containing ~60% by weight of $MoS_2$ as component (a) with an average particle size before intercalation of 2.0 microns (Aldrich), intercalated with ~0.6% by weight of Li as component (b), and dispersed in a quantity of a solution of DMSO as component (c) and $LiClO_4$ as component (d) and heavy mineral oil as component (e) and hexane as component (f) was mixed in a dry environment in a glove box by combining the components together in a sealed container and vigorously shaking by hand to form a mixture. No appreciable generation of heat or evolution of gasses was observed during the formulation of the composition.

Once formulated the composition was removed from the glove box in the sealed container and allowed to stand for ~72 hours. No appreciable separation between the components was observed and the composition had a uniform black liquid appearance.

The container was unsealed in air and composition was poured into a ceramic boat. Although somewhat subdued, a distinct odor of DMSO emanating from the composition was apparent, however no appreciable heat rise or gas evolution was observed.

In order to explore other safety and handling issues the sample of the composition was transferred to a fume hood. A quantity of the mixture was collected in a pipette and added drop-wise to a container of water. No immediate reaction was observed although bubbling, heat, and gas evolution was achieved after vigorously shaking the water/fuel mixture.

The viscosity of the composition was measured at ~68 cP at ~20C.

The resistance of the emulsion was measured by immersing electrodes, spaced ~1.0 cm apart and connected to a Fluke multimeter into the emulsion. A reading of ~200 kilo ohms was recorded at ~20C for this particular composition.

A test fuel cell was constructed by sandwiching a sheet of separator material, commonly used in lithium sulfur dioxide batteries and supplied by Eagle Picher Industries, between two nickel foam battery electrodes with dimensions ~2 cm$^2$. The electrodes were connected in series with the Fluke multimeter and set to read DC voltage. The assembled cell was secured so that the electrodes and separator remained in contact by perforated plastic plates pressed onto the external surface of each nickel electrode and held together by metal clips. Temperature sensors were pressed between the exterior surface of the electrodes and the plastic plates in a manner that protected the temperature sensors from direct exposure to the reactants. The reactants i.e. a 10 ml portion of the composition and a 10 ml sample of dilute hydrogen peroxide were loaded into syringes and simultaneously injected onto opposite electrodes of the cell. A peak of ~2V was recorded. Electrode temperatures recorded did not exceed 50C at any time during the test.

The following claims and their obvious equivalents are believed to define the true scope of the invention.

I claim:

1. A mixture having a viscosity in the range between 0.28 cP and 10,000 cP and comprising of three components (a) (b) and (c) where; (a) is an intercalation host particle, with dimensions in the range of 0.5 nanometers and 10 microns, capable of repeatedly accepting the insertion and removal of an intercalate, (b) is about 0.6% by weight of an intercalate, selected only from the group consisting of hydrogen, alkali metals, and alkali metal hydrides, (c) is a liquid that does not react chemically with components (a) and (b) that comprises a sufficient quantity of the mixture to provide a viscosity in the said range.

2. The mixture of claim 1 where the intercalation host (a) is comprised of materials selected from the group consisting of C, Si, Sn, Mg, Ca, $MoS_2$, $WS_2$, $TaS_2$, $TiS_2$, $Ti_{1.1}S_2$, $ZrS_2$, $HfS_2$, $NbS_2$, $TiSe_2$, $VSe_2$, $NbSe_2$, $HfSe_2$, $TaSe_2$, $TiTe_2$, $HfTe_2$, $VTe_2$, $MoTe_2$, $WSe_2$, $MoSe_2$, $ReSe_2$, $PtSe_2$, $V_3S_8$, $TiS_3$, $ZrS_3$, $ZrSe_3$, $HfS_3$, $HfSe_3$, $NbS_3$, $NbSe_3$, $Bi_2Te_3$, $VS_4$, LiAl, and other modified or standard AB, $AB_2$, $AB_5$, alloys and chemical hydrides.

3. The mixture of claim 1 where the intercalation host (a) is carbon.

4. The mixture of claim 1 where the intercalation host (a) is $MoS_2$.

5. The mixture of claim 1 where the intercalate (b) is hydrogen.

6. The mixture of claim 1 where the intercalate (b) is lithium.

7. The mixture of claim 1 where the intercalate (b) is lithium hydride.

8. The mixture of claim 1 where the liquid (c) is selected from the group consisting of liquid hydrocarbons, alcohols, mineral oils, ethylene carbonate and propylene carbonate, dimethyl sulfoxide (DMSO), tetramethylene sulfone (sulfolane), gamma-butyrolactone, N-methyl-2-pyrrolidinone (NMP) and tri- and tetraglymes, hexane, methanol, and mixtures and combinations of these liquids.

9. A mixture having a viscosity in the range between 0.28 cP and 10,000 cP comprised of three components (a) (b) and (c) where; (a) is an intercalation host particle, with dimensions in the range of 0.5 nanometers and 10 microns, capable of repeatedly accepting the insertion and removal of an intercalate (b) is an intercalate, selected only from the group hydrogen, alkali metals, and alkali metal hydrides (c) is a liquid that does not react chemically with components (a) and (b) that comprises a sufficient quantity of the mixture to provide a viscosity in the said range, the mixture being further comprised of components (d) (e) and (f) where; (d) is comprised of materials selected on the basis of their ability to enhance the movement of ions through liquid (c) and forms 0-20% by weight of the mixture, (e) is comprised of materials selected on the basis of their ability to enhance the safe transportation characteristics of the mixture and forms 0-20% by weight of the mixture, (f) is comprised of materials selected on the basis of their ability to improve the stability of the mixture for extended periods of time and forms 0-20% by weight of the mixture.

10. The mixture of claim 9 where component (d) is selected from the group consisting of alkali metal salts or alkali earth metal salts.

11. The mixture of claim 9 where component (e) is selected from the group consisting of oils, mineral oils, vegetable oils, and surfactants.

12. The mixture of claim 9 where component (f) is selected from the group consisting of gelling agents, swelling agents, diluents, and surfactants.

13. A fuel cell employing the mixture of claim 9 as the anodic reactant.

14. A fuel cell employing a mixture having a viscosity in the range between 0.28 cP and 10,000 cP comprised of three components (a) (b) and (c) where; (a) is an intercalation host particle, with dimensions in the range of 0.5 nanometers and 10 microns, capable of repeatedly accepting the insertion and removal of an intercalate (b) is an intercalate, selected only from the group consisting of hydrogen, alkali metals, and alkali metal hydrides (c) is a liquid that does not react chemically with components (a) and (b) that comprises a sufficient quantity of the mixture to provide a viscosity in the said range, wherein said mixture is employed in the fuel cell as the anodic reactant.

15. The fuel cell of claim 14 wherein, within the mixture the intercalation host (a) is comprised of materials selected from the group consisting of C, Si, Sn, Mg, Ca, $MoS_2$, $WS_2$, $TaS_2$, $TiS_2$, $Ti_{1.1}S_2$, $ZrS_2$, $HfS_2$, $NbS_2$, $TiSe_2$, $VSe_2$, $NbSe_2$, $HfSe_2$, $TaSe_2$, $TiTe_2$, $HfTe_2$, $VTe_2$, $MoTe_2$, $WSe_2$, $MoSe_2$, $ReSe_2$, $PtSe_2$, $V_3S_8$, $TiS_3$, $ZrS_3$, $ZrSe_3$, $HfS_3$, $HfSe_3$, $NbS_3$, $NbSe_3$, $Bi_2Te_3$, $VS_4$, LiAl, and other modified or standard AB, $AB_2$, $AB_5$, alloys and chemical hydrides.

16. The fuel cell of claim 14 wherein, within the mixture the intercalation host (a) is carbon.

17. The fuel cell of claim 14 wherein, within the mixture the intercalation host (a) is $MoS_2$.

18. The fuel cell of claim 14 wherein, within the mixture the intercalate (b) is hydrogen.

19. The fuel cell of claim 14 wherein, within the mixture the intercalate (b) is lithium.

20. The fuel cell of claim 14 wherein, within the mixture the intercalate (b) is lithium hydride.

21. The fuel cell of claim 14 wherein, within the mixture the liquid (c) is selected from the group consisting of liquid hydrocarbons, alcohols, mineral oils, ethylene carbonate and propylene carbonate, dimethyl sulfoxide (DMSO), tetramethylene sulfone (sulfolane), gamma-butyrolactone, N-methyl-2-pyrrolidinone (NMP) and tri- and tetraglymes, hexane, methanol, and mixtures and combinations of these liquids.

22. A fuel cell employing a mixture having a viscosity in the range between 0.28 cP and 10,000 cP, said mixture comprising of three components (a) (b) and (c) where; (a) is an intercalation host particle, with dimensions in the range of 0.5 nanometers and 10 microns, capable of repeatedly accepting the insertion and removal of an intercalate, (b) is an intercallate, selected only from the group consisting of hydrogen, alkali metals, and alkali metal hydrides, (c) is a liquid that does not react chemically with components (a) and (b) that comprises a sufficient quantity of the mixture to provide a viscosity in the said range.

23. The fuel cell of claim 22 where the intercalation host (a) is comprised of materials selected from the group consisting of C, Si, Sn, Mg, Ca, $MoS_2$, $WS_2$, $TaS_2$, $TiS_2$, $Ti_{1.1}S_2$, $ZrS_2$, $HfS_2$, $NbS_2$, $TiSe_2$, $VSe_2$, $NbSe_2$, $HfSe_2$, $TaSe_2$, $TiTe_2$, $HfTe_2$, $VTe_2$, $MoTe_2$, $WSe_2$, $MoSe_2$, $ReSe_2$, $PtSe_2$, $V_3S_8$, $TiS_3$, $ZrS_3$, $ZrSe_3$, $HfS_3$, $HfSe_3$, $NbS_3$, $NbSe_3$, $Bi_2Te_3$, $VS_4$, LiAl, and other modified or standard AB, $AB_2$, $AB_5$, alloys and chemical hydrides.

24. The fuel cell of claim 22 where the intercalation host (a) is carbon.

25. The fuel cell of claim 22 where the intercalation host (a) is $MoS_2$.

26. The fuel cell of claim 22 where the intercalate (b) is hydrogen.

27. The fuel cell of claim 22 where the intercalate (b) is lithium.

28. The fuel cell of claim 22 where the intercalate (b) is lithium hydride.

29. The fuel cell of claim 22 where the liquid (c) is selected from the group consisting of liquid hydrocarbons, alcohols, mineral oils, ethylene carbonate and propylene carbonate, dimethyl sulfoxide (DMSO), tetramethylene sulfone (sulfolane), gamma-butyrolactone, N-methyl-2-pyrrolidinone (NMP) and tri- and tetraglymes, hexane, methanol, and mixtures and combinations of these liquids.

* * * * *